E. E. DUSCHEK.
ROTATIVE MOTOR.
APPLICATION FILED DEC. 12, 1906.

915,751.

Patented Mar. 23, 1909.
6 SHEETS—SHEET 1.

WITNESSES

INVENTOR
Emilio Enrique Duschek
BY
ATTYS

E. E. DUSCHEK.
ROTATIVE MOTOR.
APPLICATION FILED DEC. 12, 1906.

915,751.

Patented Mar. 23, 1909.
5 SHEETS—SHEET 3.

WITNESSES
Alvin J. White
W. F. Burke

INVENTOR
Emilio Enrique Duschek
BY
ATTYS

E. E. DUSCHEK.
ROTATIVE MOTOR.
APPLICATION FILED DEC. 12, 1906.

915,751.

Patented Mar. 23, 1909.
5 SHEETS—SHEET 4.

E. E. DUSCHEK.
ROTATIVE MOTOR.
APPLICATION FILED DEC. 12, 1906.

915,751.

Patented Mar. 23, 1909.
5 SHEETS—SHEET 5.

WITNESSES
Alvin G. White
W. P. Burks

INVENTOR
Emilio Enrique Duschek
BY Richards
ATTYS

UNITED STATES PATENT OFFICE.

EMILIO ENRIQUE DUSCHEK, OF BUENOS AYRES, ARGENTINA.

ROTATIVE MOTOR.

No. 915,751.   Specification of Letters Patent.   Patented March 23, 1909

Application filed December 12, 1906. Serial No. 347,571.

*To all whom it may concern:*

Be it known that I, EMILIO ENRIQUE DUSCHEK, a subject of the Emperor of Austria-Hungary, and resident of Buenos Ayres, Argentina, have invented certain new and useful Improvements in Rotary Engines, of which the following is a specification.

The object of the invention is to provide a simple, and efficient rotary device which may be used as a rotary engine and also as a rotary pump.

An embodiment of the invention is shown in the accompanying drawings, in which,—

Figure 1:
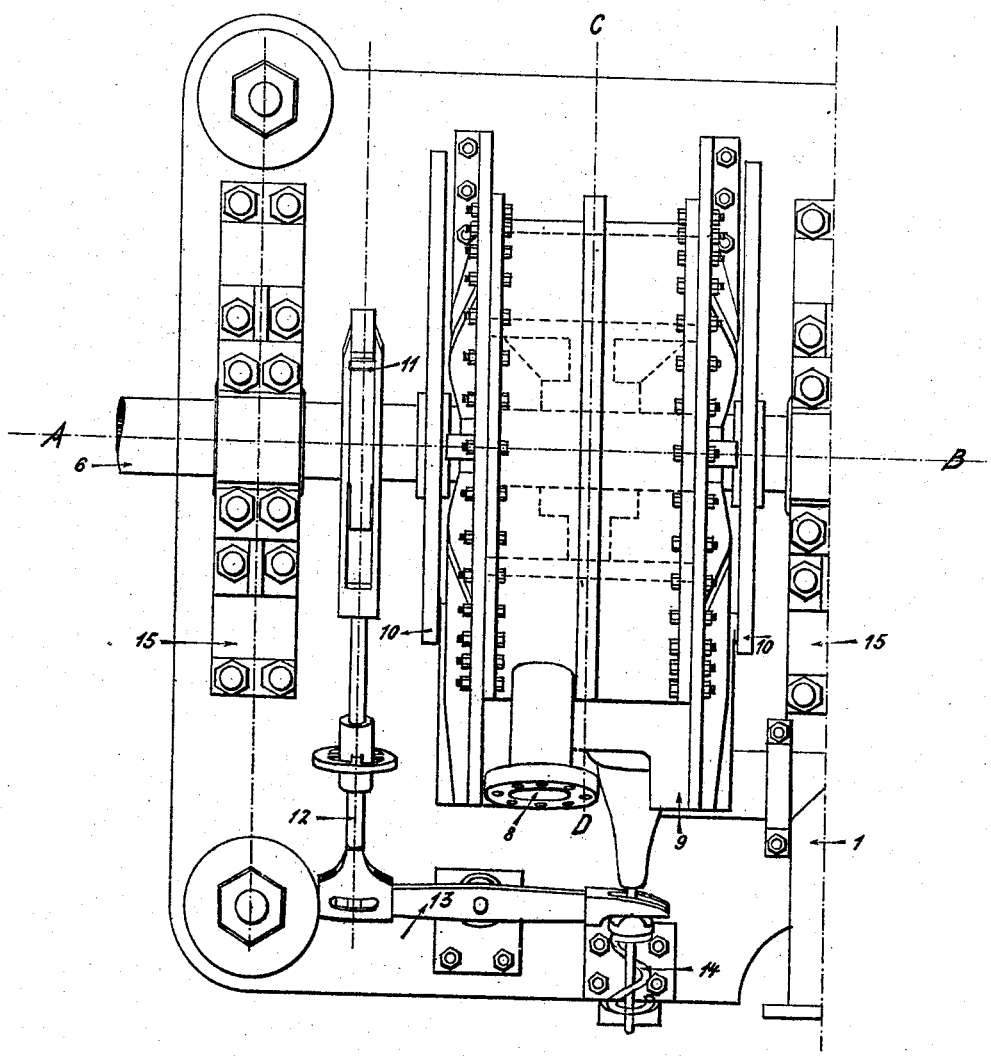
Figure 2:
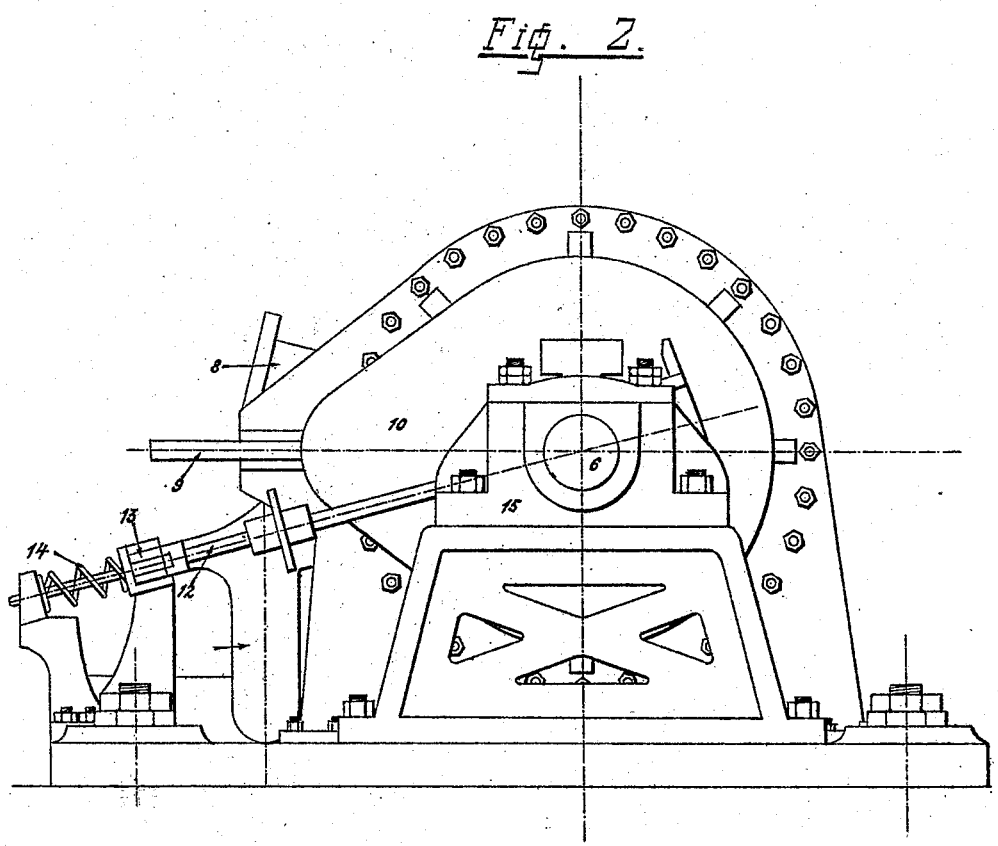
Figure 3:
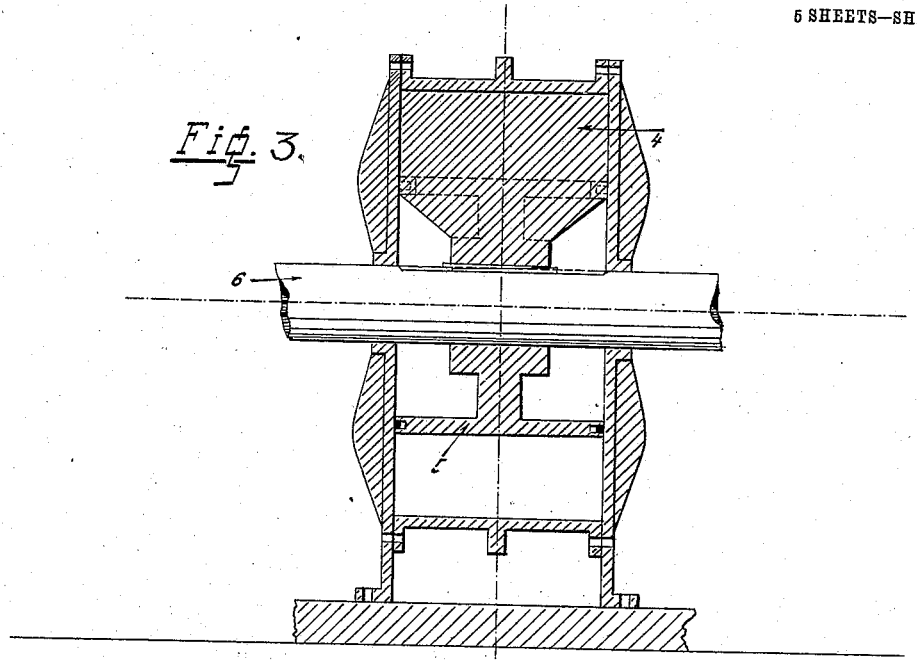
Figure 4:
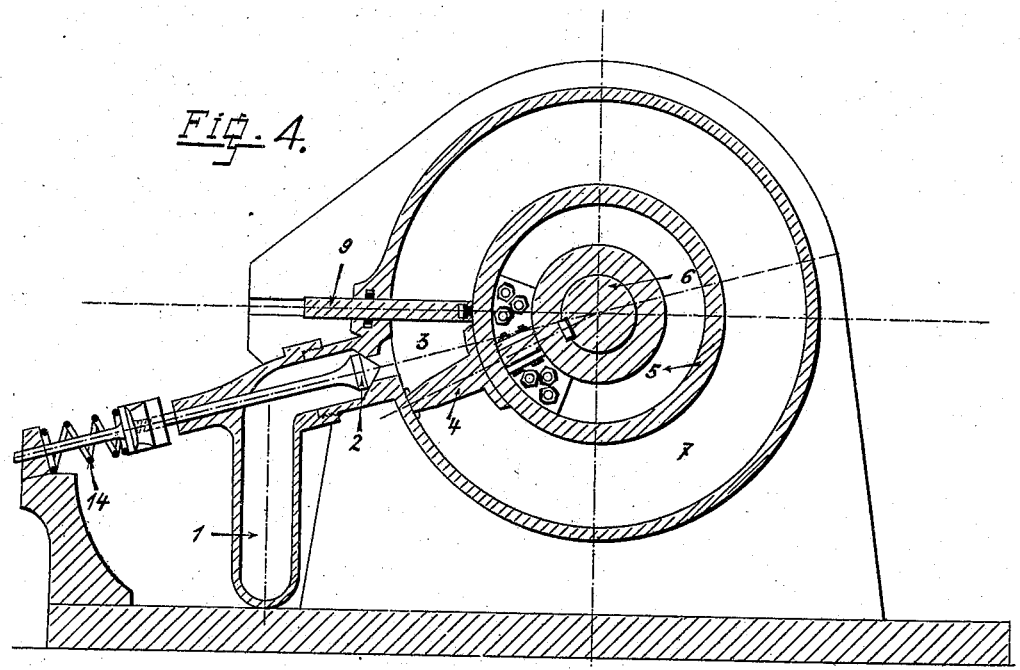
Figure 5:
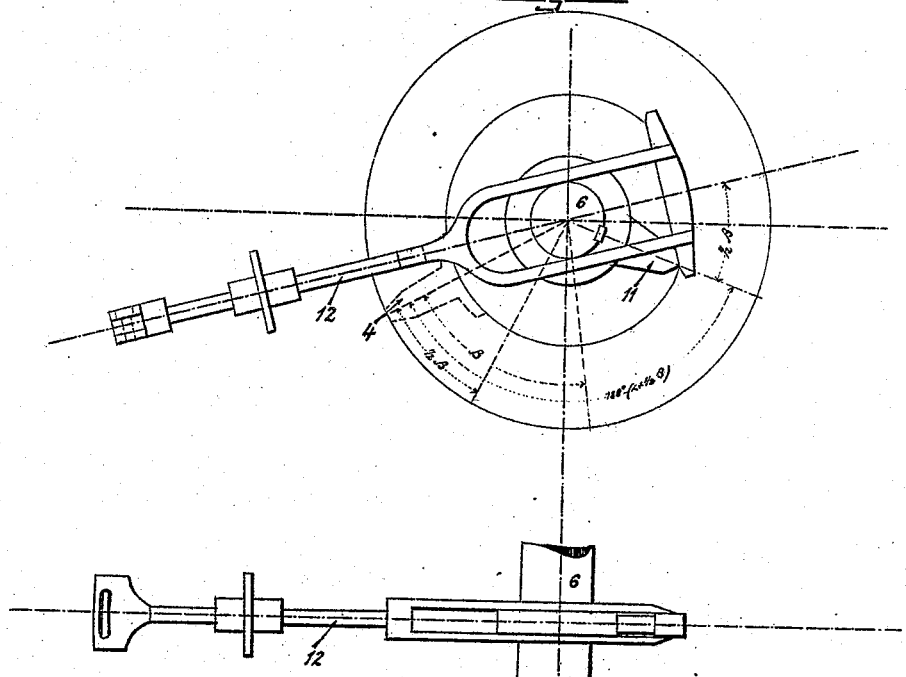
Figure 6:
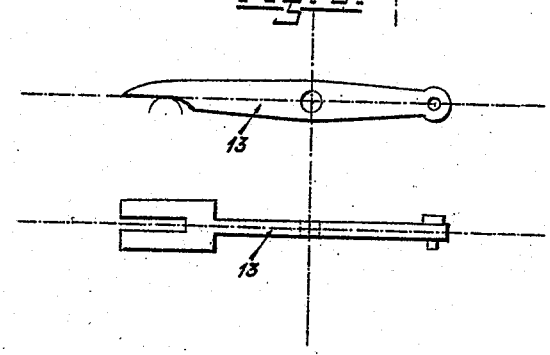
Figure 7:
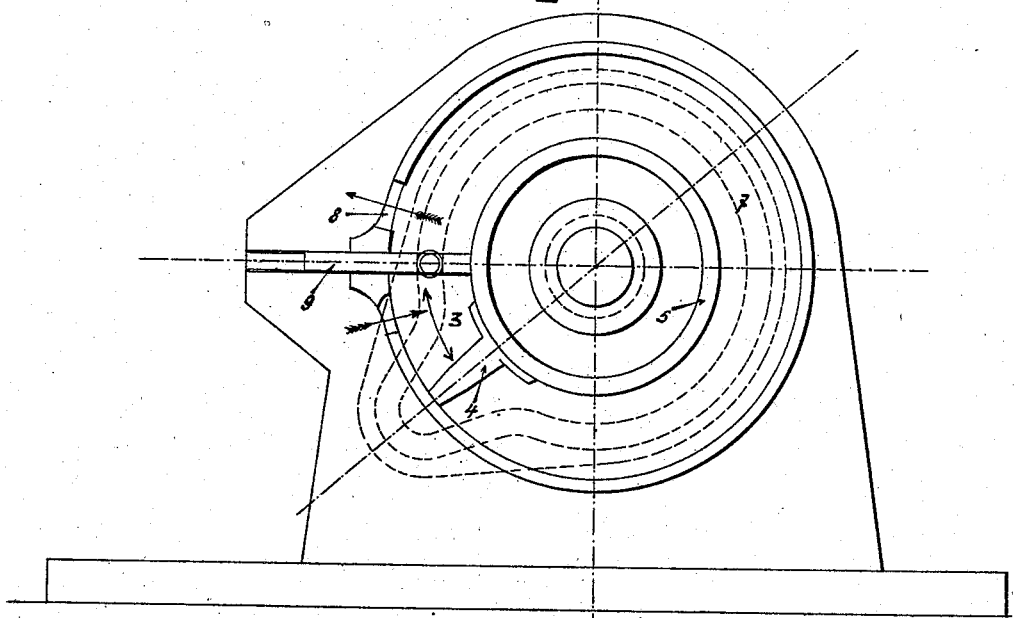
Figure 8:
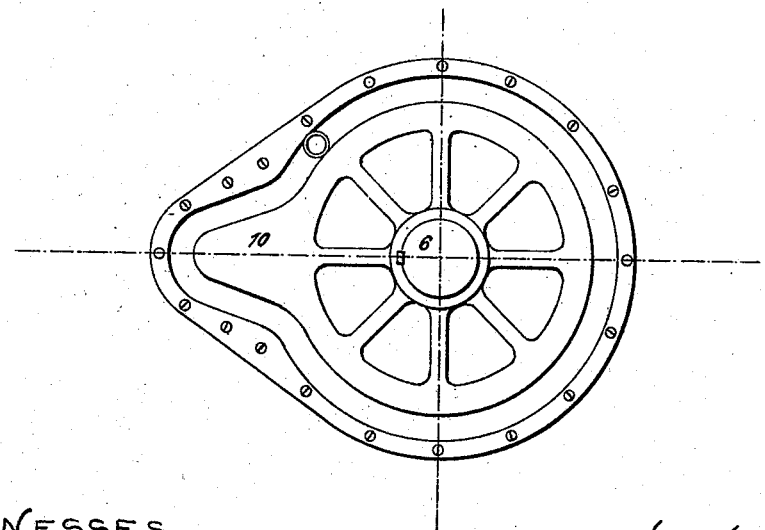

Figure 1 is a plan view of a portion of the engine. Fig. 2 is an end elevation. Fig. 3 is a longitudinal section on line A—B— of Fig. 1. Fig. 4 is a transverse section on line C—D— of Fig. 1. Figs. 5 and 6 are detailed views of the valve operating means. Figs. 7 and 8 are detailed views.

Referring by reference characters to this drawing, the numeral 1 designates an inlet for the motor fluid, such as steam, which is controlled by a valve 2. When this valve is opened, as hereinafter described, the steam passes into the space 3 which is divided off from the annular steam chamber 7 by a sliding abutment 9 and the rotary piston 4. The annular steam chamber 7 is formed between the parallel side walls and the inner and outer curved walls, as shown in Figs. 3 and 4 and the steam being allowed to expand between the stationary abutment 3 and the rotary piston 4 causes the latter to rotate and thus impart movement to the shaft 6. As the piston 4 rotates, it passes the outlet of the pipe 8 which allows the steam to exhaust, the valve 2 in the meantime being closed to cut off the inlet of steam. As the piston 4 continues to rotate, it would of course strike against the sliding abutment 9 and the latter is accordingly retracted to allow the piston 4 to pass. This is accomplished by having projecting rollers as shown in Figs. 7 and 8, which extend into eccentric grooves in the rotating wheels 10 shown therein.

The inlet valve is operated by a cam 11 carried by the shaft which engages a strap connected by the rod 12, which in turn is connected to the rocking lever 13. The action of this rocking lever opens the valve 2 at the proper time against the tension of a spring 14.

Having thus described my invention, what I claim is:—

A rotary engine comprising a cylinder, a rotary shaft passing through said cylinder, a sliding abutment in said cylinder, a rotary piston within the cylinder and connected with the shaft, wheels on each side of the cylinder and mounted on the shaft, said wheels having cam grooves therein, projections on the abutment fitting in said grooves so as to open the abutment to permit the passage of the piston, a steam inlet leading to the cylinder, a spring pressed valve inclosing said inlet, a two armed lever having one end engaging the said valve, a cam on the shaft and a lever connected with the other arm of the two armed lever and operated by said cam to open said valve at the proper time.

In witness whereof, I have hereunto signed my name in the presence of two subscribing witnesses.

EMILIO ENRIQUE DUSCHEK.

Witnesses:
JOSE G. GAUARDO,
JOSÉ ROBLES.